US010902253B2

(12) United States Patent
Jahn (10) Patent No.: US 10,902,253 B2
(45) Date of Patent: Jan. 26, 2021

(54) CONTINUOUSLY SELF-ADAPTING ARRANGEMENT FOR AUTOMATICALLY ACQUIRING DATA AND CORRESPONDING METHOD

(71) Applicant: OPEN TEXT SA ULC, Halifax (CA)

(72) Inventor: Rolf Jahn, Munich (DE)

(73) Assignee: OPEN TEXT SA ULC, Halifax (CA)

( * ) Notice: Subject to any disclaimer, the term of this patent is extended or adjusted under 35 U.S.C. 154(b) by 85 days.

(21) Appl. No.: 15/962,887

(22) Filed: Apr. 25, 2018

(65) Prior Publication Data

US 2018/0322340 A1 Nov. 8, 2018

(30) Foreign Application Priority Data

May 5, 2017 (EP) ..................................... 17169762

(51) Int. Cl.
*G06K 9/00* (2006.01)
*G06N 20/00* (2019.01)
(Continued)

(52) U.S. Cl.
CPC ..... *G06K 9/00463* (2013.01); *G06F 16/2455* (2019.01); *G06F 16/355* (2019.01);
(Continued)

(58) Field of Classification Search
None
See application file for complete search history.

(56) References Cited

U.S. PATENT DOCUMENTS 6,456,738 B1 * 9/2002 Tsukasa ............. G06K 9/00442
382/175
2007/0065011 A1 * 3/2007 Schiehlen .......... G06K 9/00469
382/181
(Continued)

FOREIGN PATENT DOCUMENTS

WO WO 2016071903 A2 5/2016

OTHER PUBLICATIONS

European Search Report issued for European Patent Application No. 17169762.6, dated Dec. 11, 2017, 9 pages.
(Continued)

*Primary Examiner* — David Perlman
(74) *Attorney, Agent, or Firm* — Sprinkle IP Law Group (57) ABSTRACT

The invention relates to a method for continuously self-adapting an arrangement for automatically acquiring data from a document using a model. The method comprises: receiving raw data of a document containing a content item, the raw data including document content information representing the content item; interpreting the received raw data based on the model to generate interpretation data including interpreted content information of the content item of the document; validating and correcting the interpretation data of the document using the raw data to generate correction data of the document, the correction data including corrected content information of the content item of the document; analyzing the interpretation data, the raw data and the correction data of the document to determine whether to update the model or not; and updating the model content information of the model using the corrected content information of the correction data.

20 Claims, 2 Drawing Sheets

(51) Int. Cl.
  *G06F 16/93* (2019.01)
  *G06F 16/2455* (2019.01)
  *G06F 16/84* (2019.01)
  *G06F 16/35* (2019.01)
  *G06K 9/62* (2006.01)

(52) U.S. Cl.
  CPC .............. *G06F 16/84* (2019.01); *G06F 16/93* (2019.01); *G06K 9/6263* (2013.01); *G06N 20/00* (2019.01); *G06K 2209/01* (2013.01)

(56) References Cited

U.S. PATENT DOCUMENTS

| | | |
|---|---|---|
| 2011/0078191 A1 | 3/2011 | Ragnet et al. |
| 2012/0148105 A1 | 6/2012 | Burry et al. |
| 2015/0379343 A1* | 12/2015 | Powell .................... G06F 16/22 382/229 |

OTHER PUBLICATIONS

Dharitri Misra, et al: "A System for Automated Extraction of Metadata from Scanned Documents Using Layout Recognition and String Pattern Search Models", Proceedings of the 12th ACM/IEEE-CS Joint Conference on Digital Libraries, Dec. 20, 2010, pp. 1-17, XP55431482.

* cited by examiner

CONTINUOUSLY SELF-ADAPTING ARRANGEMENT FOR AUTOMATICALLY ACQUIRING DATA AND CORRESPONDING METHOD

CROSS-REFERENCE TO RELATED APPLICATION(S)

This application claims a benefit of priority under 35 U.S.C. § 119(a) from European Patent Application No. 17169762.6, filed May 5, 2017, which is fully incorporated by reference herein for all purposes.

TECHNICAL FIELD

This disclosure relates generally to automatic data acquisition. More particularly, this disclosure relates to a self-adapting arrangement for automatic data acquisition. Even more particularly, this disclosure relates to a method for continuously self-adapting an arrangement for automatically acquiring data from a document using a model.

BACKGROUND ART

In the art, companies, organizations, and others are confronted with the problem to make use of information found in different types of documents such as paper-based documents, etc.

With new, modern technology, these documents can be scanned using a scanner, or are present in a machine-readable form, and entered into a database via commercially available software programs. However, on the one hand, identification and acquisition of data must, to a large extent, still be performed manually via display or screen. On the other hand, the identification and acquisition of data is error-prone, especially in case of changes in the layout of or information contained in the document.

For example, to store an invoice from one company as one document having a particular layout, it must be revised so that its layout is adapted to one that can be accepted by the software programs and then stored. This and other procedures must be repeated each time an invoice with a new layout is presented.

A need therefore exists for all who handle invoices and other forms to quickly be able to identify these and/or quickly be able to enter and store new layouts in their invoicing system.

SUMMARY

One of the objectives of the invention is to solve the problems of the background art as well as others during what is known as automatic data acquisition (identification, interpretation) in connection with the handling of information being present, for example, in a paper-based form.

More particularly, an object to be achieved by the invention is improving the rate of detection while reducing the rate of false detection in automatic data acquisition.

According to an exemplary aspect, the invention provides a computer-implemented method for continuously self-adapting an arrangement for automatically acquiring data from a document using a model. The model includes model content information representing at least one content item in a pattern document. The method comprises the steps of: receiving raw data of a document, the document containing at least one content item and the raw data including document content information representing the at least one content item; interpreting the received raw data based on the model to generate interpretation data including interpreted content information of the at least one content item of the document; validating and correcting the interpretation data of the document using the raw data to generate correction data of the document, the correction data including corrected content information of the at least one content item of the document; analyzing the interpretation data, the raw data and the correction data of the document to determine whether to update the model or not; and updating the model content information of the model using the corrected content information of the correction data.

The above-described method allows the arrangement to self-adapt continuously without the need for human intervention. Accordingly, data can be acquired automatically even in case where, for instance, the layout or structure of the document changes or in cases where data is to be acquired from a document from which data has never been acquired before. The rate of false detection with regard information from the document can therefore be reduced while the rate of detection is improved.

In one example, the method further comprises processing the document by Optical Character Recognition (OCR) to generate the raw data.

This pre-preprocessing allows for preparation of electronic documents from which data can be acquired. For example, paper-based documents can first be scanned and then OCR-processed to generate data, i.e., raw data, from the information and thus data can be acquired.

In another example, the method further comprises storing the interpretation data in association with the raw data of the document, and searching for stored interpretation data and raw data corresponding to the correction data.

This allows for verification with regard to whether the interpretation data correspond to the raw data, and allows for correction of adaption, if necessary. The rate of false detection thereby can be reduced further and the rate of detection increases.

In yet another example, the model further includes model zone information indicating a zone in the pattern document in which the at least one content item of the pattern document is placed. In that case, the interpreting includes searching for, based on document zone information indicating a zone of the at least one content item in the document, model zone information in the model indicating a zone which substantially coincides with the zone of the at least one content item in the document.

Accordingly, it is achieved to not only identify/interpret data from the raw data using information with regard to the form or any keyword, rather to do this using the position of the information expected. This allows for further improvement of the automatic data acquisition because the position, as well as the form or any keyword, can be used to interpret/identify the data.

In another example, the validating may optionally comprise applying a predetermined analysis function corresponding to the model used for interpretation and/or interacting with an operator.

This allows for further automation of the continuous self-adaptation. Moreover, the flexibility of the method is increased as it is enabled to apply analysis functions specific for the model.

The method of another example further comprises identifying the pattern document among a plurality of pattern documents having a layout corresponding to a layout of the document using the raw data received and determining the model for the pattern document among a plurality of models.

This allows for further automation of the method of the invention as it is enabled to determine the model to be used automatically.

The model further includes at least one of model description information describing a pattern document, a model identifier uniquely identifying the model, layout information defining a layout of the pattern document, a keyword corresponding to the at least one content item and model position information indicating a position of the at least one content item in the pattern document. Alternatively or additionally, the model content information contains at least one of language information, format information and description information.

According to another exemplary aspect, the invention provides a continuously self-adapting arrangement for automatically acquiring data from a document using a model. The model includes model content information representing at least one content item in a pattern document. The arrangement comprises one or more processor to execute: receiving raw data of a document, the document containing at least one content item and the raw data including document content information representing the at least one content item; interpreting the received raw data based on the model to generate interpretation data including interpreted content information of the at least one content item of the document; validating and correcting the interpretation data of the document using the raw data to generate correction data of the document, the correction data including corrected content information of the at least one content item of the document; analyzing the interpretation data, the raw data and the correction data of the document to determine whether to update the model or not; and updating the model content information of the model using the corrected content information of the correction data.

In other examples, the continuously self-adapting arrangement may comprise means to and/or may be adapted to perform functions similar to the exemplified methods for continuously self-adapting.

Yet another exemplary aspect of the invention provides a computer program stored on a non-transitory computer-readable medium, having instructions stored thereon which when executed by a computer cause the computer to perform the method for continuously self-adapting. Moreover, a non-transitory computer-readable medium on which the computer program is embodied may be provided.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description.

Embodiments discussed herein can be implemented in suitable computer-executable and/or machine-executable instructions that may reside on a computer-readable and/or a machine-readable medium (e.g., a hard disk (HD)), hardware circuitry or the like, or any combination.

Now, non-limiting embodiments of the invention are explained in more detail by making reference to the accompanying drawings.

Figure 1:
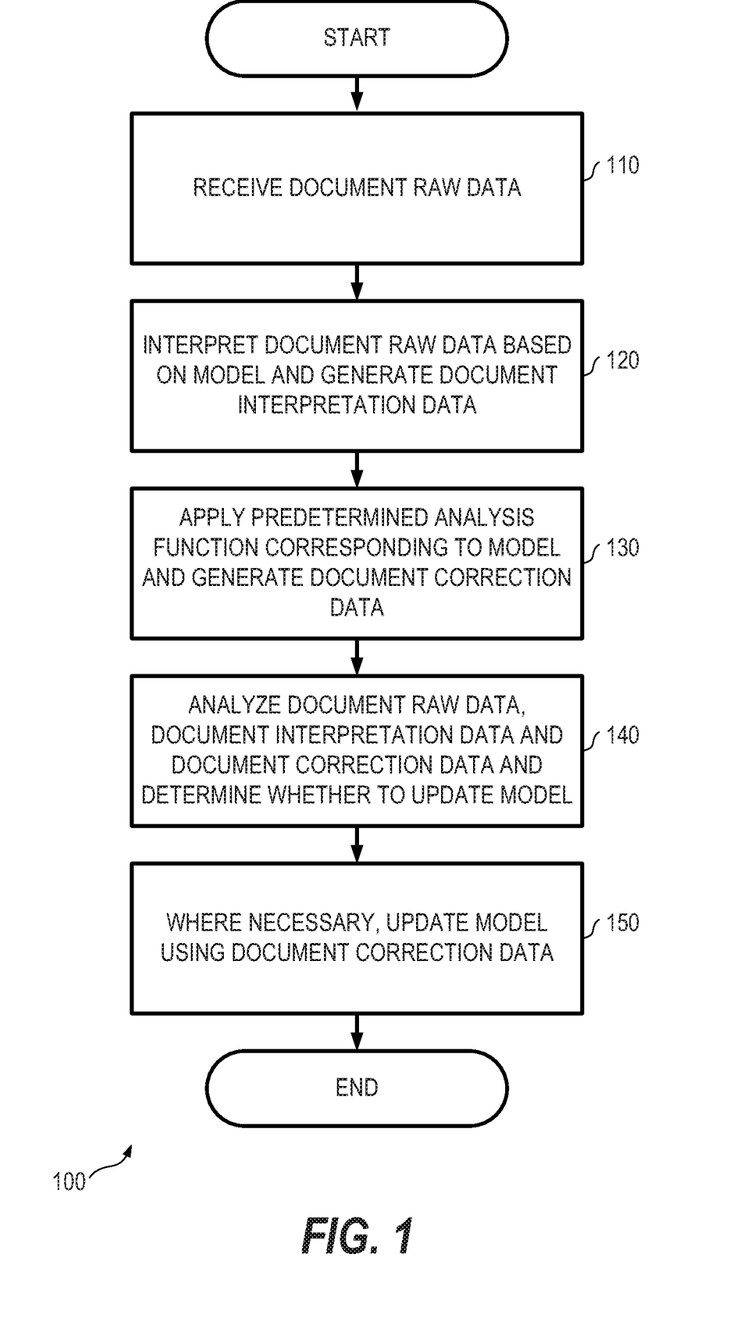
FIG. 1 is a flowchart illustrating the method for continuously self-adapting an arrangement for automatically acquiring data from a document using a model according to an embodiment.

FIG. 1 shows a flow chart/diagram illustrating a method for continuously self-adapting an arrangement for automatically acquiring data from a document using a model. The arrangement may be a computer, or a computer system comprising client computers and/or servers connected by a network, or the like.

The document from which data is to be acquired by the method disclosed hereinafter may be a paper-based document such as an order form, a delivery note, an invoice, a bank statement, or the like. It will be appreciated by those skilled in the art that the document may also be an electronic document generated by capturing a paper-based document as will be described in more detail below, or a native electronic document, i.e., a document which has been generated, processed, stored, transmitted, or the like, using electronic means only. Examples of such native electronic documents include but are not limited to Microsoft Word, Excel, PowerPoint, Adobe Portable Document Format (PDF), Hyper Text Markup Language (HTML), eXtensible Markup Language (XML), Open Document Format (ODF), and the like.

The document may have a particular layout and contains pieces of information (hereinafter content items). Each piece of information may be represented by any one of characters, numbers, text, images, graphical elements, or combinations thereof.

For example, the document may be an invoice having as content items one or more of the following: a date, an invoice number, an invoice recipient, currency, invoice amount, VAT number, VAT included or not, or the like.

In addition, the documents of one particular company, organization, or the like such as invoices may have a predetermined layout and predetermined content items at predetermined positions. For example, in an invoice of company A, the invoice number may be placed at a position 10 cm from the upper edge and 5 cm from the left edge, whereas, in an invoice of company B, at this position the invoice date may be placed and the invoice number may be placed at a position 5 cm from the upper edge and 10 cm from the left edge.

Among a plurality of documents from different companies, organizations, or the like a plurality of different layouts may exist. In addition, the layouts may change over time.

Each content item may have a predetermined syntax and semantics. In particular, the content item may start with a key phrase or keyword. For example, the keyword may be "invoice number" or "Rechnungsnummer", or the like. In this case, the semantics of the content item may be an invoice number. According to another example, the syntax of the content item being an invoice date may be "YYYYMMDD", "YYYY-MM-DD", or the like.

The semantics of a content item may be different, for example, depending on the originating country of the document. In case the content item is "$", the currency may be United States (U.S.) dollar if the document originates from the U.S., or may be Canadian dollar if the document originates from Canada, or may be Australian dollar if the document originates from the Commonwealth of Australia. It will be appreciated by those skilled in the art that the semantics of a content item may not depend on the originating country of the document only, but as well on other factors.

The model may represent a pattern document and describe the pattern document. The pattern document may be a particular type of document from a particular company, organization, or the like at a particular point in time. For example, the pattern document may be an invoice of company A for use in 2016.

The model may include model content information representing one or more content items in the pattern document. That is, the model content information may include all information corresponding to the content item concerning the invoice number such as, but not limited to position on the pattern document, the keyword, the syntax (i.e., length, number of characters and/or numbers etc.), the semantics, and the like.

The model may further include at least one of model description information describing the pattern document, a model identifier uniquely identifying the model, layout information defining a layout of the pattern document, a keyword corresponding to the at least one content item and model position information indicating a position of the at least one content item in the pattern document.

For example, the pattern document may be an invoice of company A for use in 2016 containing as content items: an invoice date, an invoice number, currency, and an invoice amount. The invoice date has the format "YYYY-MM-DD" and the invoice number starts with the keyword "INVOICE NO" and has the form "YYYY-nnnnnn". The currency is one of "USD", "EUR", and "CHF" and the invoice amount in the currency has the form "nnnnn.nn" (e.g., 9576,87). The invoice number is placed at a position 10 cm from the upper edge and 5 cm from the left edge.

In the model, the model description information may state that the pattern document is "an invoice of company A for use in 2016", the model content information representing the invoice number contains the information that it has the format "YYYY-nnnnnn". The model position information may indicate that the invoice number in the pattern document is at position 10 cm from the upper edge and 5 cm from the left edge, and the keyword may indicate that the invoice number starts with "INVOICE NO".

Also, the model content information may contain language information, format information and description information. In view of the above example, the language information may indicate that the language of the pattern document or at least the content item representing the invoice number is English while the format information may indicate the format "YYYY-nnnnnn" as the format of the invoice number. The description information may describe that the content item is "the invoice number".

Now referring to FIG. 1, the method 100 starts at block 110. In block 110, raw data of a document are received. The document may contain one or more content items as described above. The raw data generated based on the document as described below in more detail may include document content information representing the one or more content items.

The raw data may be an electronic document containing pieces of information. Each piece of information may be represented by any one of characters, numbers, text, images, graphical elements, or combinations thereof. The pieces of information (referred to as the document content information) may represent information corresponding to at least one content item of the document from which the raw data are generated. The raw data may be received in any electronic form, for example, as one of the following file formats: Microsoft Word, Excel, searchable PDF, HTML, XML, ODF, and the like.

The raw data of the document may be generated by scanning and OCR-processing a paper-based document. For example, the paper-based document may be scanned, thereby generating an image-like document. The image-like document may, for example, be a Joint Photographic Experts Group (JPEG) file or an image PDF. To generate the raw data, the image-like document may be processed using OCR. As a result, the raw data may, for example, be a searchable PDF or a Microsoft Word file.

Then, in block 120, the received raw data are interpreted based on the model. Based on the information contained in the model, it may be searched for corresponding information in the raw data. As a result, interpretation data may be generated. The interpretation data may include interpreted content information of the content items of the document.

For example, it may be searched in the raw data for information at a particular position at which an invoice number is expected and/or it may be searched for a particular keyword indicating the invoice number such as "INVOICE NO". The information found at the particular position and/or the information following the particular keyword forms, optionally together with the information concerning the particular position and information concerning the keyword, the interpreted content information. It will be appreciated by those skilled in the art that the interpreted content information may comprise other, additional, or fewer information.

In block 130, the interpretation data of the document are validated and corrected if necessary using the raw data. As a result, correction data of the document may be generated.

For example, the interpretation data may be compared to the raw data, visually by an operator or automatically by applying analysis functions as will be described below in more detail. If as a result it is determined that the interpretation data does not correspond to the raw data, that is, the data do not represent the same information, the interpretation data may be corrected. The analysis functions may be generic, or preferably associated with the model.

Taking the above example, the interpretation data may contain interpreted content information representing "2016-056857" as the invoice number. The raw data, however, show "2016056957" as the invoice number. The interpretation data may be validated by visual comparison, or it may, as an analysis function, be checked whether another invoice with the invoice number "2016-056857" has already been processed. The error in the invoice number is detected and correction data may be generated indicating that and how the interpretation data need to be corrected. The correction data, insofar, indicate that there is an error or difference in the interpretation data and that the invoice number should be "2016056957". It will be appreciated by those skilled in the art that the correction data may as well indicate that the syntax differs with regard to "YYYY" and "nnnnnn" being not separated using "-" and that in the interpreted content information the $3^{th}$ character from the right is not "8" but "9". This correction may be made by interaction with the operator, or by using the analysis function.

The interpretation data, the raw data, and the correction data of the document are then analyzed in block 140. Based on the result of the analysis, it may be determined whether the model used must be updated or not.

For example, the correction data may be applied to the interpretation data and then the corrected interpretation data may be compared to the raw data. It will be appreciated by those skilled in the art that the correction data may be compared to the raw data directly. If the comparison as the analysis indicates a difference in the syntax and/or the semantics, it may be determined that the model must be updated. In order to avoid that the model is updated with incorrect information, it may be analyzed whether the difference occurred due to misinterpretation or misidentification. If this can be excluded, it may be determined that the information in the model is outdated and does not correspond to the information in the document.

Referring to the above example, the correction data show that the syntax of the invoice number is not "YYYY-nnnnnn" as in the model, rather "YYYYnnnnnn. After an analysis, it may be determined that the model need to be updated with regard to the model content information representing the invoice number.

In block 150, the model content information of the model is updated using the corrected content information of the correction data.

In the above example, it may be determined that the format is "YYYYnnnnnn". That is, the model content information is updated to represent this format.

In other implementations of the method illustrated in FIG. 1, the interpretation data generated in block 120 and the raw data of the document may be stored in association in storage means of the arrangement, and prior to the analysis in block 140 it may be searched for interpretation data and raw data corresponding to the correction data in the storage means.

Moreover, in block 130, a predetermined analysis function may be applied. The predetermined analysis function may correspond to the model used in block 120 for interpretation and may be applied automatically. It will be appreciated by those skilled in the art that the analysis function may be applied manually or that, in block 130, it may be interacted with an operator.

Taking the above example, the interpretation data may contain interpreted content information representing "2016-056857" as the invoice number. The raw data, however, show "2016056957" as the invoice number. The interpretation data may be validated by visual inspection or comparison, or it may, as the analysis function, be checked whether another invoice with the invoice number "2016-056857" has already been processed and/or whether the invoice number in the interpreted content information meets the requirements with regard to invoice numbers. The error in the invoice number is detected and correction data may be generated indicating that and how the interpretation data need to be corrected. The correction data, insofar, indicate that there is an error or difference in the interpretation data and that the invoice number should be "2016056957".

The method illustrated in FIG. 1 may further comprise identifying the pattern document among a plurality of pattern documents having a layout corresponding to the layout of the document using the raw data received. Based on the pattern document identified, the model may then be determined among a plurality of models.

For example, the arrangement may be used to acquire data from various different documents. In order to configure the arrangement accordingly, a plurality of pattern documents is presented. Each of the plurality of pattern document represents one particular type of the various different documents from which data can be acquired.

Based on the plurality of the pattern documents, the arrangement may derive a plurality of model. As an example, the arrangement may derive one model for each of the plurality of the pattern documents. It will be appreciated by those skilled in the art that one model may be derived from one or more pattern documents. That is, the model includes all the information common among the one or more pattern documents.

The operation to derive the model from the pattern document may comprise analyzing the pattern document using analysis functions. For example, an analysis function may be used to acquire, as the layout, all positions of information and the corresponding information in the pattern document. Also, the analysis function may identify the syntax and semantics of the information. It will be appreciated by those skilled in the art that the model may be derived by interacting with an operator.

The arrangement may store the plurality of models for the plurality of pattern document in a storage such as, but is not limited to, a database. In addition, the model may be stored in association with the pattern document from which it was derived. Preferably, the arrangement may comprise another storage, separate from the storage in which the plurality of models are stored, for temporarily storing the raw data and the interpretation data. The raw data and the interpretation data being stored in said another storage until analyzing and correction in block 140 has been completed. That is, when the correction data is generated, the raw data and the interpretation data are deleted from the another storage, or alternatively, moved together with the correction data to a result storage. The result storage may be the same as the storage for storing the plurality of models, and the raw data, the interpretation data, and the correction data may be stored in association.

Based on the raw data of the document received in block 110, the layout of the document may be derived, e.g., by use of analysis functions. It may then be searched in the plurality of pattern documents stored in the arrangement for a pattern document having the same layout. It will be appreciated by those skilled in the art that the pattern document among the plurality of pattern document to be searched for may be identified based on similarity of the layout, or other indicators. The model associated with the pattern document having the same layout may then be used by the method.

Furthermore, the pattern document and/or the model may be identified by a unique identifier. The raw data, the interpretation data and/or the correction data may be assigned with the unique identifier.

Alternatively or optionally, the model may include model zone information indicating a zone in the pattern document in which the at least one content item of the pattern document is placed. Compared to the position, the zone is more robust against variations in the position where the content item is placed. For example, the zone may identify a rectangular area in the pattern document identified by positions of its upper left and lower right edges or a position of an edge together with dimensions in the width and height directions of the pattern document.

In block 120, the method may include searching for, based on document zone information indicating a zone of the at least one content item in the document, model zone information in the model indicating a zone which substantially coincides with the zone of the at least one content item in the document.

Figure 2:
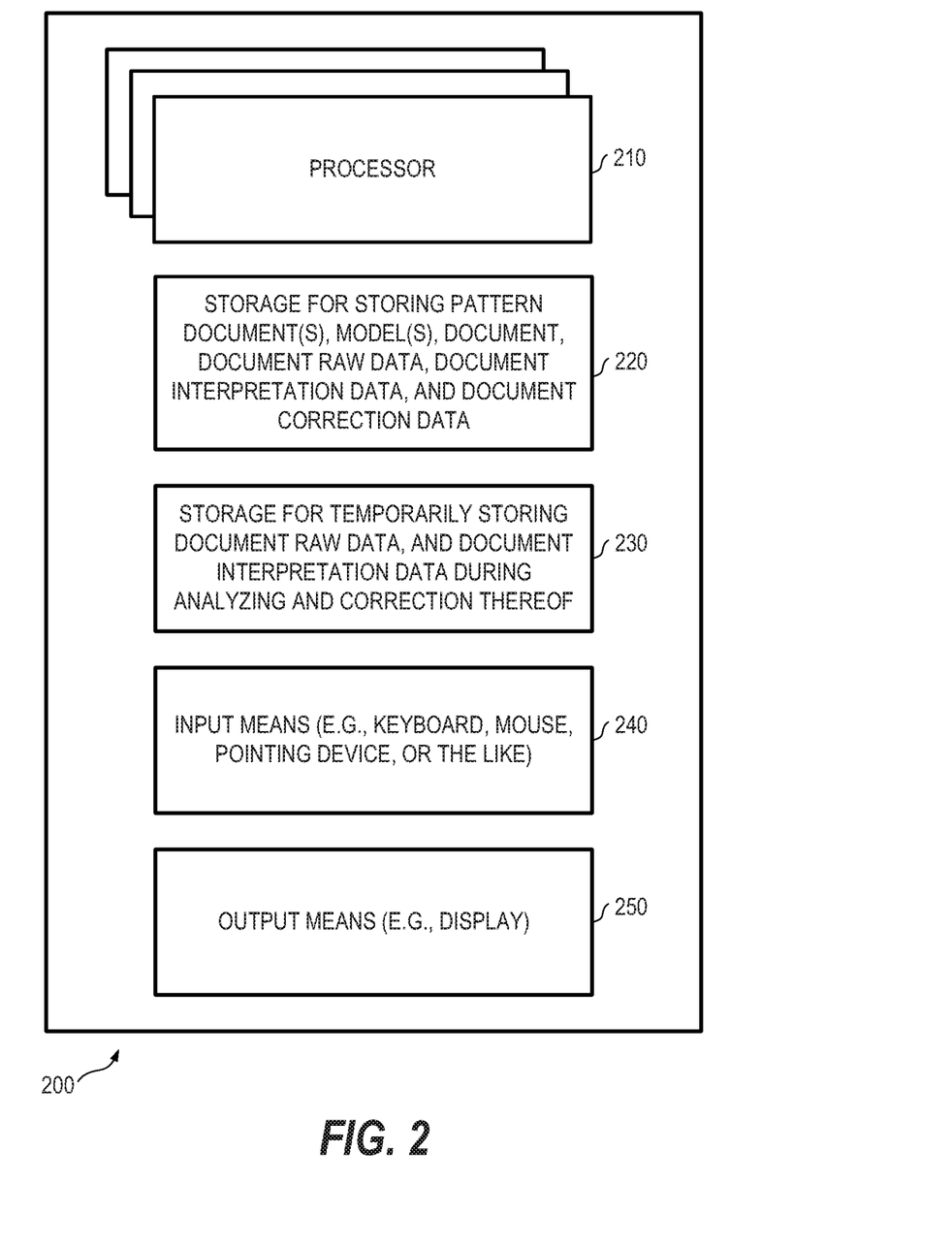
FIG. 2 illustrates a continuously self-adapting arrangement for automatically acquiring data from a document using a model according to an embodiment.

FIG. 2 illustrates a continuously self-adapting arrangement for automatically acquiring data from a document using a model according to an embodiment.

The continuously self-adapting arrangement 200 may comprise one or more processors 210 and a storage 220.

The one or more processors 210 may be configured to execute the steps illustrated and described above with reference to FIG. 1. For example, the one or more processor may execute: receiving raw data of a document; interpreting the received raw data based on the model to generate interpretation data; validating and correcting the interpretation data of the document using the raw data to generate correction data of the document; analyzing the interpretation data, the raw data and the correction data of the document to determine whether to update the model or not; and updating the model using the correction data.

Preferably, the storage 220 may store one or more of the following: the pattern document or a plurality of pattern documents; the model or a plurality of models; the document; the raw data of the document; interpretation data; and the correction data. The arrangement may further comprise another storage 230 for temporarily storing the raw data and the interpretation data during analyze and correction thereof. It will be appreciated by those skilled in the art that the storage 220 and the storage 230 may store fewer or more information such as e.g. information indicating that the model is to be updated or not.

The arrangement may further comprise input and output means 240, 250 for interacting with the operator. For example, the input means 240 may comprise a keyboard, mouse, pointing device, or the like, through which the operator can input the correction data. The output means 250 may comprise a display for displaying the raw data and the interpretation data to the operator.

These, and other, aspects of the disclosure and various features and advantageous details thereof are explained more fully with reference to the exemplary, and therefore non-limiting, embodiments illustrated and detailed in the accompanying appendices. It should be understood, however, that the detailed description and the specific examples, while indicating the some embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions, and/or rearrangements within the spirit and/or scope of the underlying inventive subject matter will become apparent to those skilled in the art from this disclosure.

Although described with respect to specific embodiments thereof, these embodiments are merely illustrative, and not restrictive. The description herein of illustrated embodiments, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features, and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer-readable medium (e.g., ROM, RAM, and/or HD), hardware circuitry or the like, or any combination thereof. Within this disclosure, the term "computer-readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer executable instructions that may reside on a computer-readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used.

In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer-readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer-readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time", "offline", in a "batch mode", etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises", "comprising", "includes", "including", "has", "having", or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the disclosure should be determined by the following claims and their legal equivalents.

What is claimed is:

1. A computer-implemented method, comprising:
receiving, by a computer, raw data of a document, the document containing a content item, the raw data including document content information representing the content item;
interpreting, by the computer using a model, the received raw data and generating interpretation data, the interpretation data including interpreted content information of the content item of the document, the model including model content information representing the content item in a pattern document;
validating and correcting, by the computer using the raw data, the interpretation data of the document and generating correction data of the document, the correction data including corrected content information of the content item of the document;
analyzing, by the computer, the interpretation data, the raw data, and the correction data of the document and, based on the analyzing, determining whether to update the model or not; and
updating, by the computer, the model content information of the model using the corrected content information of the correction data to thereby allow the computer to automatically self-adapt and improve automatic data acquisition.

2. The computer-implemented method according to claim 1, further comprising:
processing the document by Optical Character Recognition to generate the raw data.

3. The computer-implemented method according to claim 1, further comprising:
storing the interpretation data in association with the raw data of the document in a data storage; and
prior to the analyzing, searching the data storage for stored interpretation data and raw data corresponding to the correction data of the document.

4. The computer-implemented method according to claim 1, wherein the model further includes model zone information indicating a zone in the pattern document in which the content item of the pattern document is placed, and wherein the interpreting includes searching for, based on document zone information indicating a zone of the content item in the document, model zone information in the model indicating a zone which substantially coincides with the zone of the content item in the document.

5. The computer-implemented method according to claim 1, wherein the validating comprises applying a predetermined analysis function corresponding to the model used for interpretation, interacting with an operator, or both.

6. The computer-implemented method according to claim 1, further comprising:
identifying, using the raw data received, the pattern document among a plurality of pattern documents having a layout corresponding to a layout of the document; and
determining the model for the pattern document among a plurality of models.

7. The computer-implemented method according to claim 1, wherein the model further includes at least one of model description information describing a pattern document, a model identifier uniquely identifying the model, layout information defining a layout of the pattern document, a keyword corresponding to the content item, or model position information indicating a position of the content item in the pattern document, wherein the model content information contains at least one of language information, format information, or description information.

8. A system, comprising:
a processor;
a non-transitory computer-readable medium; and
stored instructions translatable by the processor for:
receiving raw data of a document, the document containing a content item, the raw data including document content information representing the content item;
interpreting, using a model, the received raw data and generating interpretation data, the interpretation data including interpreted content information of the content item of the document, the model including model content information representing the content item in a pattern document;
validating and correcting, using the raw data, the interpretation data of the document and generating correction data of the document, the correction data including corrected content information of the content item of the document;
analyzing the interpretation data, the raw data, and the correction data of the document and, based on the analyzing, determining whether to update the model or not; and
updating the model content information of the model using the corrected content information of the correction data to thereby allow the system to automatically self-adapt and improve automatic data acquisition.

9. The system of claim 8, wherein the stored instructions are further translatable by the processor for:
processing the document by Optical Character Recognition to generate the raw data.

10. The system of claim 8, wherein the stored instructions are further translatable by the processor for:
storing the interpretation data in association with the raw data of the document in a data storage; and
prior to the analyzing, searching the data storage for stored interpretation data and raw data corresponding to the correction data of the document.

11. The system of claim 8, wherein the model further includes model zone information indicating a zone in the pattern document in which the content item of the pattern document is placed, and wherein the interpreting includes searching for, based on document zone information indicating a zone of the content item in the document, model zone information in the model indicating a zone which substantially coincides with the zone of the content item in the document.

12. The system of claim 8, wherein the validating comprises applying a predetermined analysis function corresponding to the model used for interpretation, interacting with an operator, or both.

13. The system of claim 8, wherein the stored instructions are further translatable by the processor for:
identifying, using the raw data received, the pattern document among a plurality of pattern documents having a layout corresponding to a layout of the document; and
determining the model for the pattern document among a plurality of models.

14. The system of claim 8, wherein the model further includes at least one of model description information describing a pattern document, a model identifier uniquely identifying the model, layout information defining a layout of the pattern document, a keyword corresponding to the content item, or model position information indicating a position of the content item in the pattern document, wherein the model content information contains at least one of language information, format information, or description information.

15. A computer program product comprising a non-transitory computer-readable medium storing instructions translatable by a processor for:

receiving raw data of a document, the document containing a content item, the raw data including document content information representing the content item;

interpreting, using a model, the received raw data and generating interpretation data, the interpretation data including interpreted content information of the content item of the document, the model including model content information representing the content item in a pattern document;

validating and correcting, using the raw data, the interpretation data of the document and generating correction data of the document, the correction data including corrected content information of the content item of the document;

analyzing the interpretation data, the raw data, and the correction data of the document and, based on the analyzing, determining whether to update the model or not; and updating the model content information of the model using the corrected content information of the correction data to thereby allow the computer program product to automatically self-adapt and improve automatic data acquisition.

16. The computer program product of claim 15, wherein the instructions are further translatable by the processor for:
processing the document by Optical Character Recognition to generate the raw data.

17. The computer program product of claim 15, wherein the instructions are further translatable by the processor for:
storing the interpretation data in association with the raw data of the document in a data storage; and
prior to the analyzing, searching the data storage for stored interpretation data and raw data corresponding to the correction data of the document.

18. The computer program product of claim 15, wherein the model further includes model zone information indicating a zone in the pattern document in which the content item of the pattern document is placed, and wherein the interpreting includes searching for, based on document zone information indicating a zone of the content item in the document, model zone information in the model indicating a zone which substantially coincides with the zone of the content item in the document.

19. The computer program product of claim 15, wherein the validating comprises applying a predetermined analysis function corresponding to the model used for interpretation, interacting with an operator, or both.

20. The computer program product of claim 15, wherein the model further includes at least one of model description information describing a pattern document, a model identifier uniquely identifying the model, layout information defining a layout of the pattern document, a keyword corresponding to the content item, or model position information indicating a position of the content item in the pattern document, wherein the model content information contains at least one of language information, format information, or description information.

* * * * *